(12) United States Patent
Hauk et al.

(10) Patent No.: US 8,070,126 B2
(45) Date of Patent: Dec. 6, 2011

(54) DEVICE FOR ACTUATION OF A VALVE

(75) Inventors: Torsten Hauk, Neustadt (DE); Rolf Habermann, Bergen (DE); Carsten Heldberg, Kirchlinteln (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 527 days.

(21) Appl. No.: 12/373,997

(22) PCT Filed: Sep. 11, 2007

(86) PCT No.: PCT/IB2007/002608
§ 371 (c)(1),
(2), (4) Date: Jan. 15, 2009

(87) PCT Pub. No.: WO2008/035158
PCT Pub. Date: Mar. 27, 2008

(65) Prior Publication Data
US 2009/0302254 A1 Dec. 10, 2009

(30) Foreign Application Priority Data

Sep. 21, 2006 (DE) .......................... 10 2006 044 515

(51) Int. Cl.
*F16K 31/00* (2006.01)
(52) U.S. Cl. .......................................... 251/11; 137/334
(58) Field of Classification Search .................... 251/11, 251/63.5, 63.6, 61, 62; 137/334, 341, 468
See application file for complete search history.

(56) References Cited

U.S. PATENT DOCUMENTS

| | | | | | |
|---|---|---|---|---|---|
| 3,027,730 | A | * | 4/1962 | Bauerlein | 62/135 |
| 3,166,892 | A | * | 1/1965 | Sherwood | 60/527 |
| 3,169,008 | A | * | 2/1965 | Whitlock | 251/11 |
| 3,374,337 | A | * | 3/1968 | Burley | 219/501 |
| 3,500,634 | A | * | 3/1970 | Buiting et al. | 60/528 |
| 3,540,479 | A | * | 11/1970 | Thompson | 137/625.5 |

(Continued)

FOREIGN PATENT DOCUMENTS

GB 324600 A 1/1930

(Continued)

OTHER PUBLICATIONS

ISR for PCT/IB2007/002608 dated Apr. 9, 2008.

*Primary Examiner* — John Rivell
*Assistant Examiner* — Minh Le
(74) *Attorney, Agent, or Firm* — Lowe Hauptman Ham & Berner LLP

(57) ABSTRACT

A valve operating device defined by the following features: a slider supported in axially displaceable manner in a housing and linked by an actuation segment to the valve, a first biasing spring configured in the housing and pre-stressing the slider against a first stop, an expansible element configured in the housing and being displaceably supported in approximately coaxial manner relative to the slider between a second and a third stop, a second biasing spring acting on the expansible element and pre-stressing the element against the second stop, the configuration allowing cooperation between the expansible element's drive pin and the slider, a heater associated to the expansible element, a heat dissipating element associated with the expansible element and cooling the expansible element when latter rests against the third stop, the force exerted by the first biasing spring being larger than that of the second biasing spring.

6 Claims, 1 Drawing Sheet

U.S. PATENT DOCUMENTS

| | | | | |
|---|---|---|---|---|
| 3,756,083 | A | * | 9/1973 | Tatsutomi et al. ............... 60/527 |
| 3,858,611 | A | * | 1/1975 | Thayer ..................... 137/630.14 |
| 3,860,169 | A | * | 1/1975 | Norman ....................... 236/68 C |
| 3,990,418 | A | * | 11/1976 | Nohira et al. ............. 123/568.31 |
| 4,753,271 | A | * | 6/1988 | Fornasari ................. 137/625.43 |
| 4,836,496 | A | * | 6/1989 | Abujudom et al. .............. 251/11 |
| 5,025,627 | A | * | 6/1991 | Schneider ........................ 60/527 |
| 5,033,865 | A | * | 7/1991 | Kuze ............................. 374/160 |
| 5,666,810 | A | * | 9/1997 | Miesterfeld et al. ............ 60/530 |
| 2005/0056799 | A1 | * | 3/2005 | Malone ........................... 251/11 |
| 2005/0242311 | A1 | * | 11/2005 | Willers et al. ................... 251/61 |

FOREIGN PATENT DOCUMENTS

| | | |
|---|---|---|
| GB | 1083747 A | 9/1967 |
| GB | 1112603 A | 5/1968 |
| GB | 2223097 A | 3/1990 |

\* cited by examiner

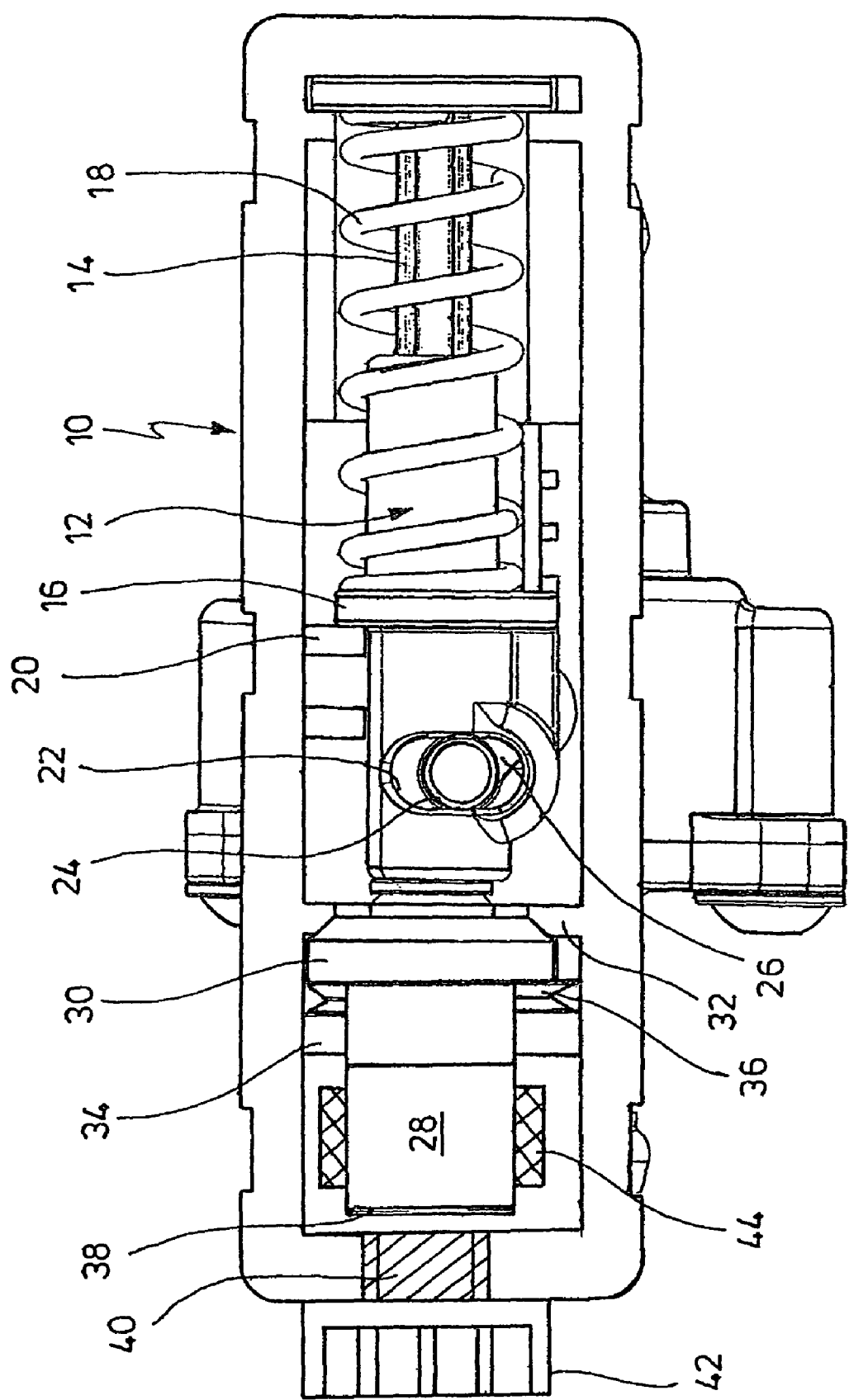

DEVICE FOR ACTUATION OF A VALVE

RELATED APPLICATIONS

The present application is based on International Application Number PCT/IB2007/002608 filed Sep. 11, 2007, and claims priority from German Application Number 10 2006 044 515.5 filed Sep. 21, 2006, the disclosures of which are hereby incorporated by reference herein in their entirety.

The present invention relates to a valve operating means defined in claim 1.

It is known to use regulating and shutoff valves in cooling systems of automobiles powered by internal combustion engines. A number of different operating means for such valves are also known, for instance reduced pressure actuators, geared motors and the like. Another way to operate such valves is using so-called expansible elements. Expansible elements are adjusting elements changing their length as a function of temperature. Electrical heaters are fitted on the expansible elements to drive valves.

Expansible elements offer the advantage of generating large forces. They also provide failsafe reliability. The latter feature is attained by the expansible element operating against a reset spring, so that, should said element fail, the reset spring moves the valve back into a position of maximum reliability.

In general the expansible element is received in a sealed housing. As a result an expansible element when being cooled only will slowly be reset into the initial state.

The objective of the present invention is to create a valve operating means operating on the expansible element principle and allowing faster reset.

This problem is resolved by the features of claim 1.

The valve operating means of the present invention comprises a slider moved by an expansible element and supported in axially displaceable manner within a housing, further being linked to the valve by an actuation segment. A prestressing spring biases the slider against a first stop. An expansible element fitted with a drive pin is coaxially displaceable relative to the slider and rests within a housing, and it may move between a second and a third stop. A second biasing spring acts on the expansible element and biases it toward the second stop, the expansible element's pin in this position being able to cooperate with the slider.

A heater and a heat dissipating element cooperate with said expansible element. The heat dissipating element cooperates with the expansible element when resting against the third stop. In this case the force exerted by the first biasing spring is larger than the force exerted by the second one.

The second biasing spring assures that, in its rest position, that is in the absence of heating, the second biasing spring shall rest against the second stop. The biasing spring stresses the slider against the first stop. Once heating is applied, the expansible element's temperature rapidly rises to the "opening temperature". Once that temperature has been reached, the expansible element's drive pin extends and displaces said element toward the third stop because initially the first biasing spring withstands deformation. In this process, the second biasing spring is prestressed. After the expansible element comes to rest against the third stop, further displacement of said drive pin entails moving the slider against the force of the first biasing spring. In this manner the first biasing spring will be driven and the slider is displaced over an appropriate actuation range of the driven valve.

When the heater is turned OFF, heat stored in the expansible element is rapidly dissipated through the heat dissipating element and the drive pin is reset by the first biasing spring from the expansible element. The slider moves back into its initial position at the first stop and again drives the valve. Once the drive pin has been sufficiently retracted, the slider reaches the first stop. Then the second biasing spring resets the expansible element and hence also the drive pin, in the process of which the expansible element comes to rest against the second stop.

In one embodiment mode of the present invention, the third stop is a heat dissipating element surface abutted by the cooling surface of the expansible element.

In another embodiment mode of the present invention, the first biasing spring is a helical spring and/or the second biasing spring is a stack of cupped spring (Belleville) washers.

In still another embodiment of the present invention, the housing contains an axial slider guide. This guide illustratively is a cross-sectionally contoured rod cooperating with a slider borehole, the slider's cross-section being complementary to the said guide rod's contour.

An embodiment mode of the present invention is elucidated below in relation to the appended drawing.

The single FIGURE shows a sideview, seen in longitudinal section, of the valve operating means of the present invention.

A slider 12 is supported in axially displaceable manner in a housing 10. The housing comprises for that purpose an axial guide rod 14 firmly joined to one end of the housing and cooperating with a borehole in the slider 12. The cross-section of said borehole is complementary to the slider contour. In this manner the slider 12 is always guided in axial manner and also is prevented from rotating.

The slider is fitted with a radial flange 16. This flange is pre-stressed by a helical spring 18 constituting a first biasing spring against a stop 20 within the housing. In the FIGURE, the flange 16 rests against the stop 20.

The slider is fitted with an elongated slot 22 running transversely to the longitudinal axis of the slider 12 on the side of the flange 16 which is opposite the helical spring 18. A roller 24 supported at the end of a lever 26 enters the said elongated slot. This lever cooperates with an omitted valve that shall be operated by the said operating means.

An expansible element 28 is configured in the other portion of the housing 10. It is fitted with a radial flange 30 which is shown in the FIGURE resting against a second stop 32. A stack of cupped spring washers 36 is configured between the flange 30 and a mating support 34 in the said housing and biases the expansible element 28 against the stop 32. In this instance the expansible element 28 is fitted with an omitted drive pin which may be shifted axially out of the expansible element 28 to adjust the slider 12 relative to the spring 18. The lever 26 and hence the valve are actuated during this displacement.

At its left end, the expansible element 28 is fitted with a metal plate 38. Said plate is shown spaced from a heat dissipating element 40 which is received in an aperture at one end of the housing 10. As indicated at 42, part of said heat dissipating element projects externally.

The FIGURE shows the valve operating means in its rest position wherein, as already mentioned above, the slider 12 rests against the stop 20 and the expansible element 28 rests against the stop 32. A heating coil 44 is mounted around the expansible element 28 and may be connected to an omitted source of electric power. Beyond a predetermined temperature, the omitted expansible element pin is shifted outward from said element and comes to rest against the slider 12. However the force exerted by the biasing spring 18 is larger than that of the biasing spring 36.

Accordingly, during the just-above discussed actuation, first the expansible element 28 is displaced off the stop 32 and comes to rest against the heat dissipating element 40. It is only after such a contact has been made that the expansible element's drive pin is able to adjust the slider and to move it to the right in the FIGURE against the force of the spring 18 in order to drive the valve.

Once the heater has been shut off, the expansible element 28, because being contact with the heat dissipating element 40, is able to cool rapidly, the drive pin being retracted into the expansible element 28, as a result of which the slider 12 is moved by the spring 18 toward the stop 20. The second biasing spring 36 is able to reset the expansible element into its initial position against the stop 32 only after said slider has reached said stop 20. During said actuation, the valve is reset into its initial state.

The invention claimed is:

1. A valve operating means defined by the following features:
    a slider supported in axially displaceable manner in a housing and linked by an actuation segment to the valve,
    a first biasing spring configured in the housing and prestressing the slider against a first stop,
    an expansible element configured in the housing and being displaceably supported in approximately coaxial manner relative to the slider between a second and a third stop,
    a second biasing spring acting on the expansible element and prestressing said element against the second stop, said configuration allowing cooperation between a drive pin of the expansible element and the slider,
    a heater associated to the expansible element,
    a heat dissipating element associated with the expansible element and cooling the expansible element when latter rests against the third stop, the force exerted by the first biasing spring being larger than that of the second biasing spring.

2. Valve operating means as claimed in claim 1, wherein the third stop is constituted by a surface of the heat dissipating element abutted by a cooling surface of the expansible element.

3. Valve operating means as claimed in claim 1, wherein the first biasing spring is a helical spring and/or the second biasing spring is a stack of cupped spring washers.

4. Valve operating means as claimed in claim 1, wherein the housing contains an axial guide for the slider.

5. Valve operating means as claimed in claim 1, wherein the slider is fitted with an elongated slot running transversely to said slider's longitudinal axis, said slot being engaged by a roller supported in a lever driving the valve.

6. Valve operating means as claimed in claim 1, wherein the heater includes a heating coil mounted around the expansible element.

* * * * *